United States Patent [19]
Goordman et al.

[11] 3,892,553
[45] July 1, 1975

[54] PRODUCT FOR PROVIDING A PHYSICAL MEDIUM FOR PLANT GROWTH

[76] Inventors: Robert V. Goordman, 16 Laurie Ter., Hackettstown, N.J. 07840; Fred Ferber, P.O. Box 338, Hewitt, N.J. 07421

[22] Filed: July 31, 1974

[21] Appl. No.: 493,454

Related U.S. Application Data

[63] Continuation-in-part of Ser. No. 433,848, Jan. 16, 1974, abandoned.

[52] U.S. Cl. .............................. 71/13; 71/14; 71/25
[51] Int. Cl. ........ C05f 7/00; C05f 9/00; C05f 13/00
[58] Field of Search .......... 71/12, 13, 14, 62, 64 G, 71/8, 25

[56] References Cited
UNITED STATES PATENTS

| | | | |
|---|---|---|---|
| 1,029,378 | 6/1912 | Lawton | 71/12 X |
| 2,797,985 | 7/1957 | Larson | 71/8 |
| 3,285,732 | 11/1966 | Schulze | 71/12 |
| 3,533,775 | 10/1970 | Brown | 71/13 X |

*Primary Examiner*—Charles N. Hart
*Assistant Examiner*—Ferris H. Lander
*Attorney, Agent, or Firm*—Silverman and Jackson, Esqs.

[57] ABSTRACT

The present invention provides a physical medium for plant growth, produced by the steps including: (a) physically extracting mineral values from ore, thus leaving a by-product of mine tailings; (b) mixing said mine tailings and organic sewage sludge together in order to form an organically enriched material; (c) adding pulverized garbage and rubbish to the mixture of step (b); (d) dehydrating the mixture of step (c); and (e) crushing the resulting mixture into particles having a diameter of no more than about 2.0 millimeters, thereby obtaining a sufficiency of molecular surface area and lattice structure that will permit water and nutrient retention as well as an ion change necessary for the extended physical and chemical support of plant life.

17 Claims, 5 Drawing Figures

PRODUCT FOR PROVIDING A PHYSICAL MEDIUM FOR PLANT GROWTH

REFERENCE TO RELATED APPLICATION

This application is a continuation in part of Ser. No. 433,848, filed on Jan. 16, 1974, and now abandoned.

BACKGROUND OF THE INVENTION

One of the basic agricultural problems which has existed since time immemorial is that of obtaining land which is endowed with a topsoil of sufficient richness to support crops and plant life. Such land is unfortunately not the common condition upon most of the earth. That is, there are comparatively few areas of the world's total land mass which are sufficiently well endowed in order to support agriculture to any significant degree.

The conventional response to the above problem has been that of developing various fertilizers intended to enrich the natural condition of the land in order to increase its ability to support plant life. This approach may be adequate in certain marginal areas where the mineral deficiencies are not too great. However, in most regions, the mere addition of fertilizer is not sufficient to create arable land out of non-arable land.

It is of course possible to achieve a chemical synthesis of one or more of the numerous types of arable topsoils which exist; however, the economics of such a direct chemical synthesis would render production of topsoil by such a method to be prohibitive in cost. In addition to an appreciation of the economic shortcomings which have attended the synthesis, by chemical means, of topsoil, one must, for purposes of a complete understanding of the present invention, appreciate that all prior attempts directed to the creation of a soil substitute have failed to provide a true simulation of the molecular lattice structure which makes possible the continued supply of vital mineral nutrients to plant roots over an extended period of time. A representative discussion of the physical chemistry involved in this all-important nutrient supply function appears in the book entitled *SOILS — An Introduction to Soils and Plant Growth*, published by Prentice-Hall, Inc., 1971, authored by Donahue, et al. (See Chapter 3, Pages 52 thru 66).

In the above discussion by Donahue, as well as in numerous other papers produced by soil scientists, the significance of the actual physical environment that is provided for plant growth, as opposed to the mere chemical composition of that environment, is extensively discussed. Therein the essential conclusion of all soil scientists is that any soil, to be adequate as a medium of plant growth, must possess a complex combination of chemical and physical properties. The physical medium must be such that the mineral nutrients within the soil will not be rapidly consumed by the plant and the surrounding environment of microflora and fauna, but rather will provide a uniform release, through its lattice structure, of essential mineral nutrients.

The significance of such a slow nutrient time-release function of soils has long been appreciated, not only at the theoretical level, but also in practical commercial terms. For example, the patent to Pierce, U.S. Pat. No. 3,172,752 (1965), entitled Article of Manufacture for Controlled Release of an Active Agricultural Substance, exemplifies the long-standing commercial efforts which have been directed to the development of fertilizing mediums whose functions would go far beyond the limitations of conventional fertilizers and thereby provide an extended time release of nutrients, in a manner that would approximate the function of a natural soil matrix.

Prior art efforts in the area of soil simulation have been limited to various methods for the production of different types of fertilizers. No known attempts at the creation of a true physical substitute for soil appear in the art.

The reason for the apparent lack of activity in this area has resided in the difficulty attendant to the obtaining of an economically suitable base material which could approximate the necessary physical qualities of soil. In this regard, the most obvious substitute soil base would be that of finely crushed rock. Inasmuch as most soil is, over a period of many centuries, formed from rocks of various types, this approach might, at first, appear to be viable. However, the difficulty in such an approach resides in the cost factors involved in the crushing of any rock to low fines. Thus, market research has shown that the cost of crushing rock down to fines of less than 2 millimeters would render the ultimate cost of any synthetic topsoil thereby produced to be prohibitive with respect to actual market demand.

As a solution to the above difficulty the present inventors have discovered that in many mining processes, particularly those involving metallic minerals such as gold, silver, and copper, the processing of the mineral ore produces, as a natural by-product, great quantities of finely crushed rock. At present, little, if any, practical use is made of this non-metallic by-product which is commonly termed mine tailings.

The instant invention proposes the use of these mine tailings as the base material in the formation of a synthetic topsoil.

In addition to the use of mine tailings, the present invention seeks to utilize other heretofore unused by-products and waste materials such as garbage, rubbish, and sewage sludge in order to create a total simulation of the soil matrix and its attendent physiochemical lattice structure.

The thought that waste products could, in some manner, be utilized in order to obtain a type of soil fertilizer has, from time to time, manifested itself in the prior art. Among the types of waste materials to which attention has been drawn are solid wastes, sewage, chemicals and various types of minerals, such as feldspar, graphite and basalt.

Among the earliest known prior art efforts is the patent to Lawton, U.S. Pat. No. 1,029,378 (1912), in which there is disclosed a fermentation process, occurring over a period of three to six weeks, in which certain elements of the present invention, such as rock, garbage, sewage and other organic materials, are conglomerated within a heating fermentation tank in order to ultimately produce a fertilizer. The rocks utilized therein are dissolved in order to leach the various fertilizing nutrients therefrom. This is a chemical process in which the basic soil matrix of the crushed rock is totally dissolved. Hence, the patent to Lawton discloses an aeration, heating, and decay process in which the ultimate product is that of a fertilizer (that is, a soil additive), not a soil.

A patent to Wallace, U.S. Pat. No. 1,260,103 (1918), discloses the use of finely ground minerals added to garbage in order to yield a fertilizer. Garbage is mixed with an amount of dry mineral matter capable of taking up all free liquid in the garbage. The mixture is then ground in order to produce a consistency having unfilled air spaces and passages extending through the mixture.

It is then subjected to fermentation by aerobic bacteria under controllable conditions as to air and moisture, so as to stimulate a rapid growth of the bacteria until the garbage material has been largely fermented.

A patent to Derleth, U.S. Pat. No. 1,617,014 (1927), illustrates the use of diatomaceous earth in association with sewage in order to produce a fertilizer. Derleth shows that through the introduction of diatomaceous earth into sewage prior to aeration, a nitrification and coagulation of the solids suspended within the sewage will occur. Fats and oils will be absorbed by the diatomaceous earth and the subsequent filtration of the sludge will be facilitated. The nitrified sludge containing diatomaceous earth with solids removed from the sewage will have substantial value as a fertilizer.

In Williams, U.S. Pat. No. 3,135,595 (1964), one observes the use of waste metal mine tailings in the production of a fertilizer. The thrust of Williams is directed to recovering the natural, water-soluble elements from pulverized rock and ore mining wastes in order to make such water-soluable elements available for use as an effective soil fertilizer. However, as in the case of Lawton, no attempt is made to use the pulverized rock as the base material for a soil matrix.

A patent to Brown, U.S. Pat. No. 3,533,775 (1970), proposes the use of sewage sludge and municipal waste, in conjunction with the application of considerable heat, in order to produce a nitrogen-rich fertilizer. This patent, while illustrative of contemporary efforts in the field, does not illustrate the use of rocks or suitable silica material which could provide the necessary crystalline or lattice structure required in order to approximate the long-term nutrient supply function of natural topsoil.

A related attempt to utilize both garbage and sewage in order to produce a fertilizing material appears in the patent to Scheel, U.S. Pat. No. 3,758,287 (1973). In Scheel, a specific mineral composed of oxides of magnesium and iron (Olivine) is mixed with concentrated sulphuric acid in order to form a paste which is in turn mixed with a combination of comminuted garbage and sewage. The end product obtained is a mixture which is useful as a plant food. Inasmuch as the Scheel patent represents a method for utilizing inorganic minerals, garbage and sewage, it can be viewed as representative of the state of the art in the field to which the present invention pertains.

SUMMARY OF THE INVENTION

The principal objects of the present invention are:

1. To propose a synergistic solution to the problem of disposal of organic and inorganic wastes such as garbage, sewage sludge and mine tailings and, by said solution, to produce a method of forming a synthetic topsoil;

2. To reduce the costs of, and eliminate many of the problems incident to, disposal of organic waste by current methods while, at the same time, salvaging, conserving, and profitably utilizing a large proportion of the organic nutrient value of said wastes in order to form a synthetic topsoil;

3. To provide a process applicable in the disposal and reconstitution of various kinds of garbage, sewage sludge and mine tailings;

4. To provide a procedure which will (a) substantially eliminate the need for the incineration of garbage, (b) greatly reduce the need for land-fill operations, and (c) largely reduce the deleterious effects of the dumping of sewage sludge into rivers, oceans and other bodies of water;

5. To provide a process capable of sterilizing and deodorizing various organic wastes and integrating said wastes into a valuable end product;

6. To provide a process by which large volumes of garbage, rubbish and sewage sludge can be disposed of at a lower cost than is conventionally possible, while concurrently utilizing waste materials from mining operations and producing therefrom an invaluable synthetic topsoil; and 7. To provide a physical and chemical medium for plant growth that will, in all vital aspects, simulate a natural soil matrix, while utilizing organic and inorganic materials which have heretofore been viewed as waste products.

BRIEF DESCRIPTION OF THE DRAWINGS

FIG. 2 is a flow diagram of the various resources, operations and products that may be associated with the present invention.

DETAILED DESCRIPTION OF THE INVENTION

The present invention attempts to effect a comprehensive use of a wide spectrum of waste materials generated by both commercial and residential sources. The possible sources of these waste materials are shown in the flow diagram of FIG. 2. The means of transportation by which these divergent materials may be brought to the site of topsoil production include pipe lines, barges, rail and truck.

Figure 2:
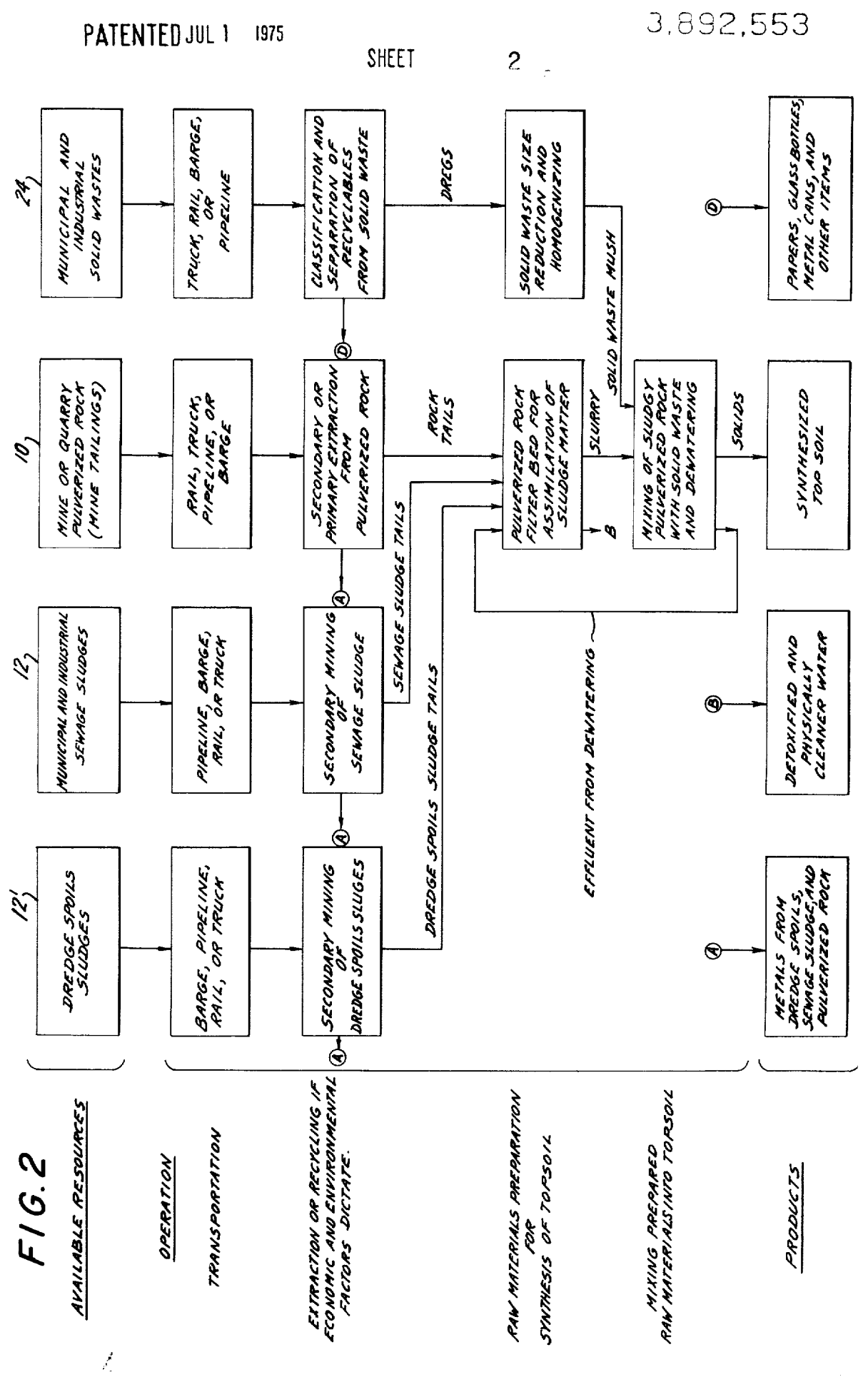

In addition to the production of topsoil, many other valuable products may be recovered through the resource system illustrated in FIG. 2. For example, various heavy metals, detoxified water, papers, and glass are among the numerous products which a total recycling system would yield.

Figure 1:
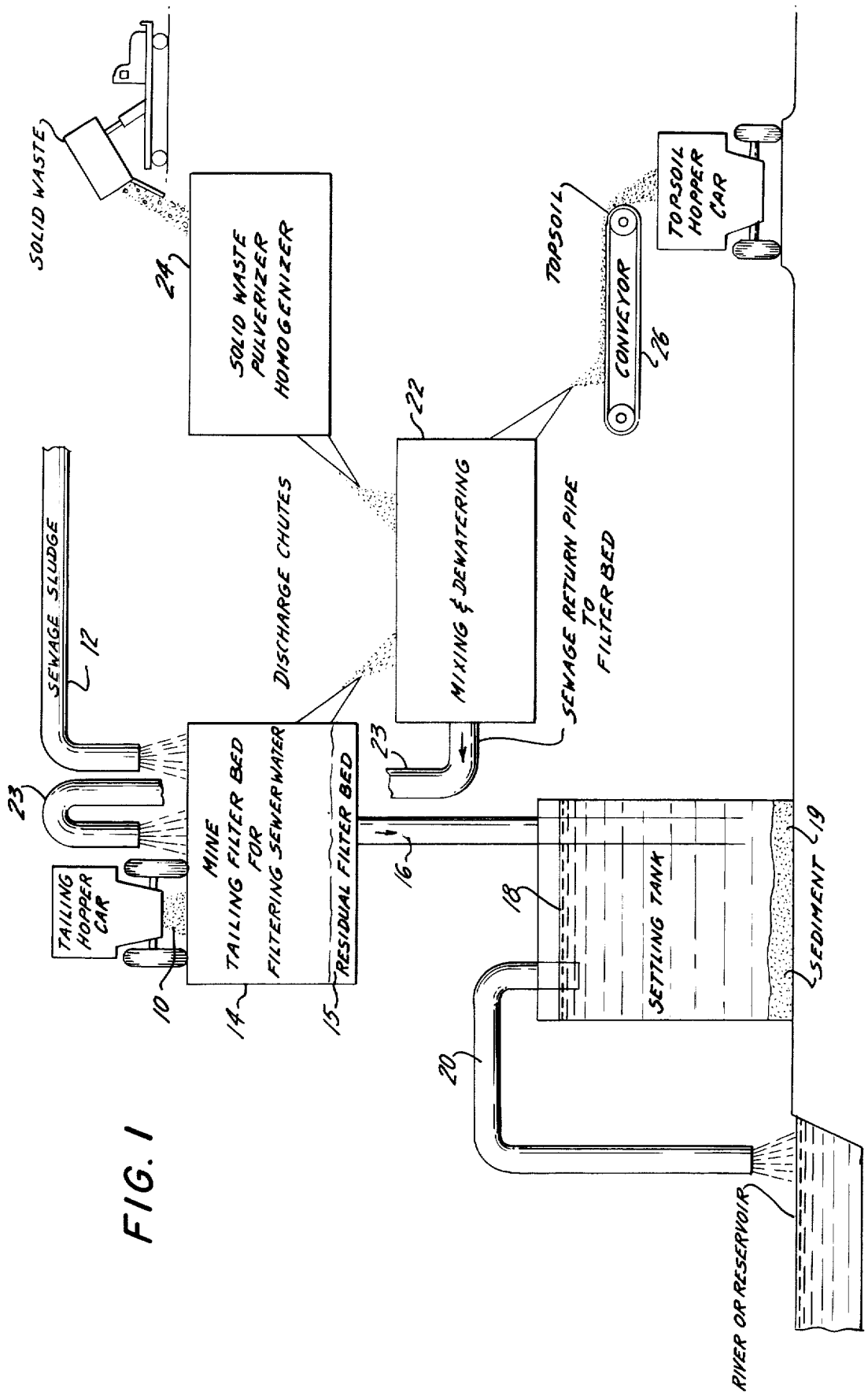
FIG. 1 is a flow diagram of the present inventive process.

Turning now to the particulars of the present invention, it may be seen in FIG. 1 that mine tailings 10, which are produced by the physical extraction of mineral values from ore, are shown as they are discharged from a mine tailings hopper car. The tailings can be obtained from either an open pit mining operation or, if the deposit is mined by underground methods, by tunnelling, drifting, or stoping procedures.

Wherever the physical location of the mine might be, the tailings can be easily transported to a location in which sewage treatment and solid waste land fill are presently conducted. At such a location, sewage sludge 12 is fed into a tank 14 in which the mine tailings 10 are allowed to absorb between 5 percent and 30 percent of their weight in sewage sludge.

The mixing of the tailings 10 and the sludge 12 serves two purposes. Firstly, the plant food nutrients within the sludge are imparted to the tailings, thereby obtaining an organically enriched material. The second function of the tank 14 is that of filtering the liquid component of the sludge through a residual filter bed 15 which naturally forms at the bottom of the tank 14. A purified liquid 16, which is primarily water, flows out through the bottom of tank 14 and into a settling tank 18 in which any sediment or other solid deposits will settle to a position 19. From the settling tank, the purified water is carried out through pipe 20 into a river or reservoir where, after treatment, it can be utilized as drinking or industrial water.

Accordingly, it is seen that a twofold use is made of the sewage sludge; its organic mineral nutrients are added to the mine tailings in order to create an enriched material, while its filtrate or liquid component is recycled for ultimate use as part of the region's water supply.

From the tank 14, the enriched mine tailings are discharged into a mixing and dehydrating tank 22. In tank 22 the enriched tailings are thoroughly mixed with 10 to 50 percent of their weight in pulverized garbage and rubbish, which enters tank 22 from a solid waste pulverizer and homogenizer unit 24.

With regard to the respective quantities of the components of the topsoil, a desirable general rule is that the ratio of the weight of the mine tailings to the aggregate in weight of (a) the sewage sludge and (b) the garbage and/or rubbish should be greater than or equal to one. A ratio of this nature will insure the provision of a sufficient quantity of soil base material, namely, mine tailings, such that the vital physical matrix of natural topsoil will be evident in the end product. It has been found, through experimentation, that, depending upon the concentration of organic material which is desired for a particular agricultural application, the following ratio groups of (a) mine tailings to (b) sewage sludge to (c) garbage and rubbish, have been found to be desirable-100:5:10, 80:30:50, 100:30:10, 100:5:50, 100:10:5 and 80:50:30. Expressed in terms of percentages, it has been found that favorable soil compositions are obtained where the mine tailings comprise between 51 and 87 percent of the mixture by weight, where the sewage sludge comprises between 4 and 16 percent by weight and where the pulverized garbage and rubbish comprise between 9 and 33 percent by weight.

From tank 22, the liquid component resident therein is pumped through a pipe 23 back into the residual filter bed 15.

The solid component of the mixture in tank 22 is discharged onto a conveyor belt 26 on which the mixture can be heated in order to evaporate any remaining moisture therein. The product on belt 26 includes garbage and rubbish pulverized to preferably less than 10 mesh or a maximum particle size of 2.0 millimeters.

In the pulverizing process indicated at element 24 and, if desired, repeated after the use of conveyor 26, a selectable crushing of the solid materials in the present mixture to a uniform particle sized distribution, ranging from essentially coloidal-sized particles up through particles having a diameter of, as aforestated, 2.0 millimeters is considered desirable. As shown in the following table, such a distribution in particle sizes will insure the presence of a spectrum of different and desirable physical and chemical properties within the ultimately obtained synthetic topsoil.

TABLE I

Figure 3:
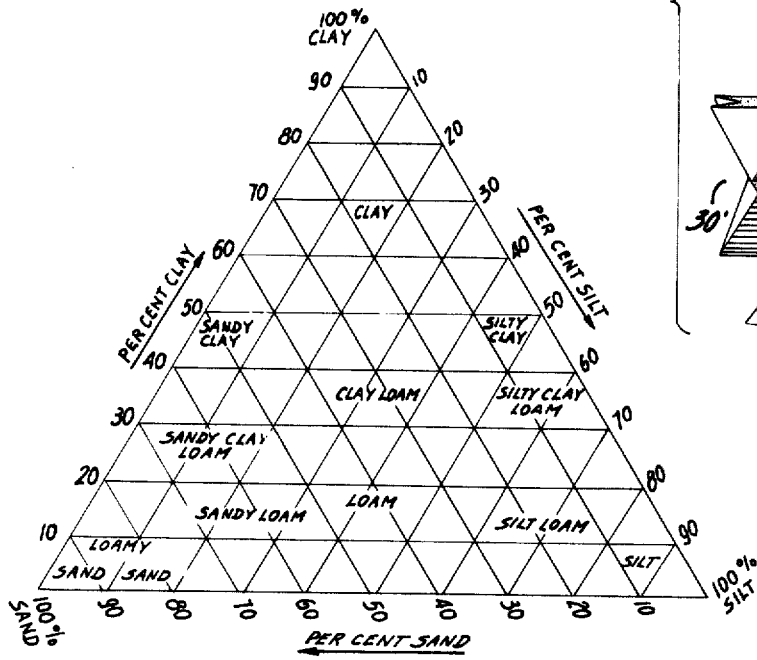
FIG. 3 is a triangular graph of soil textural classification.

| Soil Separate | Diameter Range (mm) |
| --- | --- |
| Very coarse sand | 2.0–1.0 |
| Coarse sand | 1.0–0.5 |
| Medium sand | 0.5–0.25 |
| Fine sand | 0.25–0.10 |
| Very fine sand | 0.10–0.05 |
| Silt | 0.05–0.002 |
| Clay | <0.002 |

Where a particular textural class of soil is desired, a suitable mesh screen arrangement can be applied either before or after conveyor 26 (see FIG. 1) in order to obtain any of the soil diameters indicated in Table I. After these soil diameters have been obtained and appropriately separated, they can be mixed in accordance with the triangular graph of FIG. 3 in order to obtain any desired textural class of soil. Examples of mixtures which can be used to produce three common types of topsoil are shown in the following table.

TABLE II

| Sand | Silt | Clay | Textural Class |
| --- | --- | --- | --- |
| 65 | 25 | 10 | Sandy loam |
| 20 | 20 | 60 | Clay |
| 20 | 70 | 10 | Silt loam |

It is to be noted that the clay-sized particles are a necessary component of any soil mix. This assures that the soil will have a sufficiency of molecular surface area and lattice structure which will permit necessary water and nutrient retention as well as an ion exchange necessary for the extended physical and chemical support of plant life.

It is also noted that the use of sewage sludge and pulverized garbage adds hydrocarbons, and other organic nutrients essential for the growth of desirable soil bacteria and algae. The organic matter in sewage sludge further aids in the water and nutrient retention of the end product, which is commercially known as Protosoil.

At the point of ultimate use, sand and fine gravel will usually be added to the mixture of the present invention. This will provide the permeability and soil texture required for air and water movement, as well as the friability and looseness needed for each of root growth and of mechanical cultivation.

Among the various types of mine tailings that can be used in the present process are:

(a) Siliceous materials, i.e., those materials comprised primarily of silica (silicon dioxide)$SiO_2$. These materials also include quartz $SiO_2$ and opal $SiO_2.H_2O$. Siliceous materials generally comprise about 90 percent silica with about 10 percent alumina and magnesia. All of these materials are relatively chemically inert. Hence, to the extent that siliceous materials are utilized in the present process, such use represents the recovery of matter which would otherwise play little, if any, role in the life cycle of our environment.

It is to be noted that the role, in topsoil, of siliceous material is primarily physical (as opposed to chemical) in that it provides the fine soil texture needed for water and nutrient retention. Said retention derives from the greater surface area per unit volume that is provided by the smaller particle sizes in which siliceous materials generally appear. The use of these materials as a Protosoil base would be particularly indicated for those soil applications wherein particular strength and rigidity within the soil structure is required, for example, those situations wherein trees, bushes and other plant life having large physical dimensions are contemplated as the primary agricultural requirement of the region in which the Protosoil is to be utilized.

(b) Feldspathic materials, i.e., those materials comprised primarily of alkali aluminum silicates, such as (1) orthoclase and microcline feldspars whose common formula is $KAL_2Si_3O_8$, (2) the plagioclase group of albite $Na_2Al_3Si_3O_8$, and (3) anorthite $CaAl_2Si_2O_8$.

Where feldspathic material is involved, the resultant mine tailings will generally consist of finely pulverized aluminum silicates of potassium, sodium and calcium. These feldspars, in addition to their fine particle size, have desirable chemical properties, one of which is ion exchange. That is, in the presence of the carbon dioxide (from the air) which dissolves in the surface waters that will enter the soil, a carbonic acid $H_2CO_3$ solution will result that will convert the feldspars into hydrous aluminum silicate clay, as is shown by the following equation:

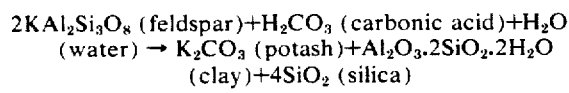

$2KAl_2Si_3O_8$ (feldspar)$+H_2CO_3$ (carbonic acid)$+H_2O$ (water) $\rightarrow$ $K_2CO_3$ (potash)$+Al_2O_3.2SiO_2.2H_2O$ (clay)$+4SiO_2$ (silica)

The potash will fertilize the clay, thus providing an ion exchange, with nutrient and water retention therein. In other terms, the lattice structure of the clay formed from feldspathic material is such that its chemical lattice structure will absorb vast quantities of moisture and mineral nutrients. The release of said moisture and nutrients does not occur rapidly, as in the case of conventional fertilizers, but rather occurs over an extended time-frame, at a rate determined by the interaction of the plant roots and said lattice structure, thereby providing nutrition to the plant life over a period of many years. Accordingly, it may be appreciated that feldspathic materials would be indicated as a soil base for Protosoil in those agricultural applications in which the use of a perennial food crop, such as wheat, rye, corn or barley, is contemplated over an extended period of time.

(c) Argillaceous material, i.e., those materials comprised primarily of layered hydrous aluminum (or magnesium) silicates. These include the clay minerals of kaolinite $Si_2O_5(OH)_4$ and montmorillonite $AlSi_2O_5.(OH).X(H_2O)$ in which the dominant impurities therein are calcium, magnesium and iron. The use of argillaceous materials as a Protosoil base would be indicated for those agricultural situations where a rapid nutrient supply function is required. For example, such extreme native soil conditions as a desert would probably require an argillaceous base material in order to produce a rapid and immediate matrix of clay materials capable of directly imparting their properties to the soil.

Figure 4:
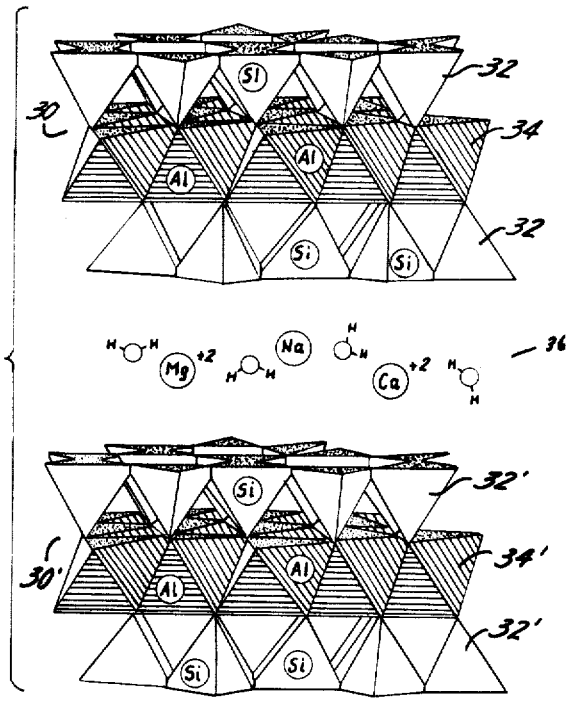
FIG. 4 is a representation of the crystalline structure of a clay mineral in a typical topsoil.
Figure 5:
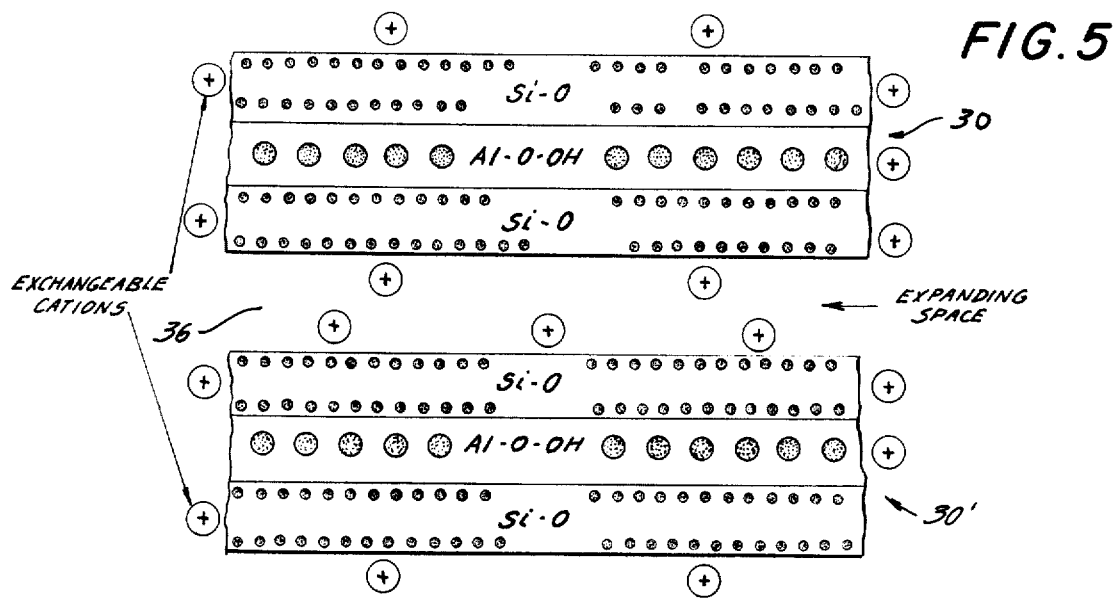
FIG. 5 is a chemical representation of the physical structure shown in FIG. 4.

An example of the argillaceous material of montomorillonite clay appears in FIGS. 4 and 5. FIG. 4 is an illustration of the argillaceous montmorillonite clay mineral, consisting of three-layered unit cells 30 and 30' comprising two silicon atom tetrahedra 34 on each side of an aluminum atom octahedra 34, bonded by oxygen atoms (not shown). The space 36 between the unit cells 30 and 30' is expansible and permits therein the presence of varying amounts of water and exchangable ions, such as calcium, magnesium, and sodium as well as other vital plant nutrients.

In FIG. 5 is shown a two dimensional chemical sketch of the crystalline structure of FIG. 4, showing the expansible space 36 between the three-layered unit cells 30 and 30'.

It must, at this point, be emphasized that the expansible space 36 in which moisture and vital plant nutrients are stored and, over an extended period of time, discharged, represents the essential difference in function between the present synthetic topsoil and a mere soil fertilizer. One must appreciate the significance of this fact in order to fully comprehend the agricultural, and thus humanitarian, import of the present invention.

At the site of usage the Protosoil would, in order to obtain suitable pH levels (6.0 to 8.0), comprise the addition of certain fertilizers and soil conditioners, such as lime. The addition of lime $CaCO_3$ will not only add the nutrient calcium, but will also raise the pH to a level which is favorable to the growth of soil microrganisms. In addition, the lime will aid in the production of carbonic acid $H_2CO_3$ which will further promote the conversion of the silica and aluminum silicate into clay minerals.

With regard to the level of bulk density which is desirable for most soil applications, it has been discovered that a suitable bulk density can be obtained through the crushing and mixing of the Protosoil such that the volume of solid materials therein approximates the volume of air spaces within a given volume.

In light of the above description, it may be appreciated that materials which would otherwise be totally discarded are integrated in such a way as to produce a suitable substitute for topsoil. Viewed from another point of view, it can be stated that much of the energy utilized in the generation of waste material is recovered by virtue of the production of a synthetic topsoil which can then produce life-sustaining agricultural products. These products will in turn comprise a perennial time integrable energy source of substantial magnitude.

It is therefore seen that the objects enumerated in the Summary of the Invention have been efficiently attained by the above-described embodiments of the invention. While there have been herein shown and described the preferred embodiments of the invention, it will be understood that the invention may be embodied otherwise than as herein specifically illustrated or described and that within said embodiments certain changes in the details and composition, and the form of arrangement of the parts, may be made without departing from the underlying idea or principles of this invention within the scope of the appended claims.

Having thus described our invention, what we claim as new, useful and non-obvious and accordingly secure by Letters Patent of the United States is:

1. A product for providing a physical medium for plant growth, produced by the steps consisting essentially of:

a. physically extracting mineral values from ore, thus leaving the by-product of mine tailings;

b. mixing said mine tailings and organic sewage sludge together in order to form an organically enriched material;

c. adding pulverized garbage and rubbish to the mixture of step (b);

d. dehydrating the mixture of step (c) to remove any remaining moisture therefrom; and e. crushing the resulting mixture into particles having a diameter of no more than about 2.0 millimeters, thereby obtaining a sufficiency of molecular surface area and lattice structure that will permit water and nutrient retention as well as an ion exchange necessary for the extended physical and chemical support of plant life.

2. The product by process as recited in claim 1 in which said crushing step (e) comprises the crushing and mixing of said resulting mixture to a level of bulk density in which the volume of solid material therein approximates the volume of the air spaces within said material.

3. The product by process as recited in claim 1 in which:

a. said mixing step comprises the mixing by weight ratio of about 100 parts of tailings with between 5 and 30 parts of sewage sludge; and b. said adding step comprises the adding, by weight ratio to said tailings and sludge, of between 10 and 50 parts of garbage and rubbish.

4. The product by process as recited by claim 1 in which said process further comprises a step (f) of: adding sand to the product of step (e).

5. The product by process as recited by claim 4 in which said process further comprises a step (g) of: adding lime to said product of claim 4.

6. The product by process as recited by claim 1 in which said crushing step comprises the selectable crushing into a uniform particle size distribution of between essentially colloidal sized particles to particles having a diameter of 2.0 millimeters, in accordance with the graph of FIG. 3.

7. The product by process as recited in claim 1 in which:

a. said mixing step (b) comprises the mixing by weight ratio of about X parts of mine tailings with Y parts of sewage sludge; and b. said adding step (c) comprises adding, by weight ratio to said tailings and sludge, of Z parts of garbage and rubbish, wherein the weight ratio of X:(Y+Z) is greater than or equal to one.

8. The product by process as recited in claim 1 in which:

a. said mixing step (b) comprises the mixing by weight ratio of about X parts of mine tailings with Y parts of sewage sludge; and b. said adding step (c) comprises adding, by weight ratio to said tailings and sludge, of Z parts of garbage and rubbish, wherein desirable mutual ratios of X: Y: Z are selected from the ratio groups consisting of 100: 5: 10, 80: 30: 50, 100: 30: 10, 100: 5: 50, 100: 10: 5 and 80: 50: 30.

9. The product by process as recited in claim 1 in which the ore of said step (a) is essentially siliceous in composition.

10. The product by process as recited in claim 1 in which the ore of step (a) is essentially feldspathic in composition.

11. The product by process as recited in claim 1 in which the ore of said step (a) is essentially argillaceous in composition.

12. The product by process as recited in claim 1 in which said physically extracting step (a) further includes the step of: pulverizing said tailings to about 50 microns or less.

13. The product by process as recited in claim 1 in which said mixing step (b) is followed by the step of: filtering and treating the liquid component of said organic sludge which is composed primarily of water, and feeding it into a regional water supply.

14. A product for providing a physical medium for plant growth by the steps consisting essentially of:

a. mixing pulverized rock and organic sewage sludge in order to form an organically enriched material;

b. adding pulverized garbage to the mixture of step (a);

c. dehydrating the mixture of step (b) to remove any remaining moisture therefrom;

d. crushing the resultant mixture into particles having a diameter of no more than about 2.0 millimeters; and e. mixing of the mixture of step (d) in order to obtain a bulk density in which the volume of solid material approimates the volume of the air spaces trapped within said material, thereby obtaining a sufficiency of molecular surface area and lattice structure that will permit a water and nutrient retention as well as an ion exchange necessary for the extended physical and chemical support of plant life.

15. The product by process as recited in claim 14 in which: said pulverized rock comprises between 51 and 87 percent of the mixture by weight; said sewage sludge comprises between 4 and 16 percent by weight; and said pulverized garbage and rubbish comprises between 9 and 33 percent by weight.

16. The product by process as recited in claim 13 in which:

a. said mixing step (b) comprises the mixing by weight ratio of about X parts of pulverized rock with Y parts of sewage sludge; and b. said adding step (c) comprises adding, by weight ratio to said tailings and sludge, of Z parts of garbage and rubbish, wherein desirable mutual ratios of X: Y: Z are selected from the ratio groups consisting of 100: 5: 10, 80: 30: 50, 100: 30: 10, 100: 5: 50, 100: 10: 5 and 80: 50: 30.

17. The product by process as recited in claim 13 in which:

a. said mixing step comprises the mixing by weight ratio of about X parts of pulverized rock with Y parts of sewage sludge; and b. said adding step comprises the adding, by weight ratio to said pulverized rock and sewage sludge, of about Z parts of pulverized garbage and rubbage, wherein the weight ratio of X: (Y+Z) is greater than or equal to one.

* * * * *